US006456987B1

(12) United States Patent

Pauschinger

(10) Patent No.: US 6,456,987 B1

(45) Date of Patent: *Sep. 24, 2002

(54) PERSONAL COMPUTER-BASED MAIL PROCESSING SYSTEM WITH SECURITY ARRANGEMENT CONTAINED IN THE PERSONAL COMPUTER

(75) Inventor: Dieter Pauschinger, Hohen Nueundorf (DE)

(73) Assignee: Francotyp-Postalia AG & Co., Birkenwerder (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,498

(22) Filed: Feb. 24, 1998

(30) Foreign Application Priority Data

Mar. 13, 1997 (DE) ........................................ 197 11 998

(51) Int. Cl.[7] ................................................ G06F 17/00

(52) U.S. Cl. ...................................................... 705/408

(58) Field of Search ................................ 705/401, 406, 705/408, 410, 404, 60, 407, 62; 235/375

(56) References Cited

U.S. PATENT DOCUMENTS

| | | | | |
|---|---|---|---|---|
| 3,869,986 A | * | 3/1975 | Hubbard | 101/91 |
| 4,168,533 A | * | 9/1979 | Schwartz | 705/403 |
| RE31,875 E | | 4/1985 | Check, Jr. et al. | 705/405 |

(List continued on next page.)

FOREIGN PATENT DOCUMENTS

| | | |
|---|---|---|
| EP | 0 493 948 | 7/1992 |
| EP | 0 665 518 | 8/1995 |
| EP | 0 717 374 | 6/1996 |
| WO | WO 88/01818 | 3/1988 |

OTHER PUBLICATIONS no author, "Pitney–Bowes demos new technology at Postal Forum"; Nov. 1999; Purchasing, v127n7, p108; DialogWeb copy pp. 1–3.*

*Primary Examiner*—Hyung-Sub Sough
*Assistant Examiner*—Thomas A. Dixon
(74) *Attorney, Agent, or Firm*—Schiff Hardin & Waite

(57) ABSTRACT

A mail processing system has a printing machine base station controlled via a personal computer. A printhead for a purely electronic printing is driven by a printing control electronics and, together with a conveyor unit, forms which is adaptable to items of differing thicknesses printing station for mixed mail processing. The components of the personal computer are in communication via a PC system bus and include a security arrangement that is connected to the PC system bus via a parallel input/output interface and is connected to the printing machine base station via at least one fast interface. The fast interface is a specific data transmission unit for fast serial data transmission to the specific interface unit and/or to the printing control electronics of the machine base. The security arrangement contains a user-specific hardware circuit with units for the implementation of accounting and security functions. The hardware circuit is connected to non-volatile memory modules and to a security processor that is programmed with a non-readable program in order to implement at least one security function.

19 Claims, 7 Drawing Sheets

U.S. PATENT DOCUMENTS 4,746,234 A 5/1988 Harry ...................... 400/120.1
4,800,506 A * 1/1989 Axelrod et al. ............. 235/375
4,802,218 A * 1/1989 Wright et al. ................. 380/23
4,858,138 A 8/1989 Talmadge
4,868,757 A * 9/1989 Gil ............................. 705/406
5,121,432 A 6/1992 Gilham et al. ................ 380/51
5,200,903 A 4/1993 Gilham ....................... 705/408
5,257,197 A 10/1993 Günther et al. ............. 705/406
5,309,393 A 5/1994 Sakata et al. ............ 365/189.1
5,510,992 A 4/1996 Kara .......................... 705/408
5,590,198 A 12/1996 Lee et al. ..................... 705/61
5,710,721 A 1/1998 Rieckhoff et al. .......... 705/401
5,731,980 A * 3/1998 Dolan et al. ................ 705/410
5,822,739 A * 10/1998 Kara .......................... 705/410
5,835,689 A * 11/1998 Braun et al. ................ 705/410
6,081,795 A * 6/2000 Ryan, Jr. .................... 705/408

* cited by examiner

PERSONAL COMPUTER-BASED MAIL PROCESSING SYSTEM WITH SECURITY ARRANGEMENT CONTAINED IN THE PERSONAL COMPUTER

BACKGROUND OF THE INVENTION

1. Field of the Invention

The present invention is directed to a mail processing system with a printing machine base controlled via a personal computer of the type having a number of personal computer components in communication with each other via a personal computer system bus, and the printing machine base including a printing station for purely electronic printing in which a printhead is connected to printhead control electronics.

2. Description of the Prior Art

A system of the above type is suitable for processing filled letters of different formats given medium through high shipping quantities. The basic structure composed of the two components, personal computer and machine base station, enables economical adaptation to different customer demands. The system can be operated as a franking system, a shipping system or a postal matter valuation system for a number of carriers.

Letter production ensues at the personal computer in modern offices. The letters that are printed out are manually put in envelopes in the office or are automatically placed in envelopes with an envelope stuffing system. Beginning with a medium through higher number of letters to be sent, or other postal matter, postage meter machines are used in a standard way for franking the postal matter. For example, U.S. Pat. No. 4,746,234 is directed to a thermal transfer postage meter machine that is surrounded by a secured housing.

It is known to construct a franking system composed of individual components. U.S. Pat. No. 5,510,992 (Post N Mail) discloses a system that is composed of two components, namely a personal computer and an office printer. The postage is stored in hardware modules that are connected to the personal computer PC via a standard interface. A specific program that is stored on the PC-contained storage media (for example, hard disk) implements the postage calculation, reduces the stored amount of postage and generates the data for the franking imprint that are transmitted to the office printer. Except for the specific postage memory modules, this PC system manages without additional hardware components, however, it is affected by two deficiencies:

a) The use of an ordinary office printer only enables unfilled envelopes to be printed. Filled envelopes, with their varying letter thicknesses, cannot be drawn into an office printer. This disadvantage limits the application of such a system to the smallest quantities of letter pages. This solution cannot be utilized in a mail expediting office that is to prepare mail arriving centrally from various departments of a concern in a form ready for shipping.

b) The postage accounting program that is processed by the processor of the personal computer can be tampered with. The program can be modified such that it works like the original except for the reduction of the postage amount that is stored in the specific postage memory module. The customer would thus have no necessity of reloading the postage memory module in return for payment at the postal authority, whereas he can continue to provide his expedited mail with franking imprints in an unlimited fashion. Access to the postage accounting program is easily possible, for example by removing the hard disk. This could not even be documented since the program—in contrast to a conventional, electronic postage meter machine—is not in a tampered housing. The manipulated program can be stored in addition to the original program and would be normally run, except in the case of an inspection, when reversion to the original program is made. If the tampered program is also protected by a pass word, the tampering can hardly be detected at all.

A PC-supported franking device is disclosed in European Patent 459 159 that is protected better against manipulation. This solution is based on a specific franking module that is insertable into a slot of a personal computer and is connected to the internal information and power supply network of the personal computer. This franking module contains an independent processor system with postage memories as well as an integrated printing device for the franking of envelopes. By integrating the printing device, one succeeds in overcoming the general deficiency of a lack of security of the aforementioned PC franking system. The user prompting advantageously utilizes the resources of a personal computer, particularly the monitor, keyboard and operating system. Although this solution allows the processing of filled letters to a limited extent, it only allows small letter formats. The slot of the personal computer must also have a correspondingly suitable size (5¼") in order to accept the franking module, but this is assured with decreasing frequency due to the increasing miniaturization of modern personal computers. The manual supply of the envelope or of a postage tape is only suitable for mail processing on a small scope, i.e. for a low volume of mail. An automatic processing of stacked mail is already precluded due to the lack of a possibility of combination with an automatic letter separation unit. This solution is thus also only suitable for low letter volume.

According to U.S. Pat. No. Re. 31,875, a protected electronic meter is located between a computer and a protected printer, with the protected printer being connected to the meter via protective lines and protected connector parts. The user is not allowed to change the meter nor to open the protected line in order to expand the system. Such a system is not service-friendly.

U.S. Pat. No. 5,200,903 discloses a similar solution. A personal computer or a work station is connected via a multi-path cable to a peripheral postage meter machine that contains an accounting and control module (meter) and a printer both for printing the postage imprint as well as for printing the recipient address. A modem is connected to the personal computer. The personal computer functions as communication equipment and assumes the calculation of the respective postage fees for the individual shipped items on the basis of stored postage fee tables. The peripheral accounting module is relieved of this calculation-intensive and memory-intensive function. No additional scale has to be connected to the postage meter machine when the weight of the letter can be calculated by the personal computer on the basis of the letter contents. The accounting module of the postage meter machine includes a processor system with postage memories and undertakes the accounting. The directly connected control module controls the printing of address and postage imprint. Due to the protective housing, protected lines and protected connector parts between accounting module and printer can be foregone in this solution. Adequately good access to an individual components for a service, however, is still not established.

The low working speed of the overall system is disadvantageous in both of these aforementioned solutions. This speed is defined by the data transmission rate on the connection between the input/output port of the personal computer and that of the accounting module. For lack of a suitable base station for conveying postal matter, a fast, automatic processing of mixed mail, with changing postage fees from letter-to-letter, is practically impossible.

U.S. Pat. No. 5,309,393 discloses a remotely loaded postage meter machine that is connected to a personal computer that contains a modem and sets up a communication connection with a telephone network. A scale can be additionally connected to the postage meter machine or can be integrated in the postage meter machine housing. This is again a closed, and thus protected, system that, however, continues to exhibit the aforementioned disadvantages. Alternatively, an open system is proposed according to another embodiment of U.S. Pat. No. 5,309,393. An interface board is inserted into a slot of the personal computer, this interface board contains an interface to a scale cell and to a display unit as well as a non-volatile electronically erasable and programmable memory EEPROM for the mail registers (ascending register, descending register). A standard printer that produces the franking imprint is connected to the personal computer via a parallel I/O interface. The primary password, stored in a non-volatile memory of the personal computer, enables access to all franking operations. A secondary password for the user is stored in the EEPROM of the interface board. Whether the security of the system against manipulation is assured beyond this level is not disclosed. Most public mail carriers still have reservations with respect to the security of open systems. Moreover, such a printer also does not seem suitable for processing a high and differing mail volume.

In U.S. Pat. No. 5,590,198, a removable meter insert is likewise inserted into a slot of a personal computer, the insert corresponding to the standard of the Personal Computer Memory Card International Association (PCMCIA). The insert includes further, required modules for an open system in order to assure the necessary security against manipulation. A user password is required for operating the franking system, however, a re-initialization is possible with a super password generated by a data center, i.e. without having to send the meter insert back to the manufacturer. A standard printer that produces the franking imprint is in fact connected to the personal computer in unsecured fashion. The printed postage value in the postage stamp imprint, however, is secured with an additionally printed, digital signature. The authorization is checked at the mail carrier on the basis of the digital signature on the postal matter. The introduction of such a system will only become possible after the postal authorities and private carriers are equipped with an appropriate monitoring technology. The commercially available printers are in fact adapted for connection to a personal computer and are switchable in order to be able to print an unfilled enveloped. Such printers, however, are not designed for handling a medium through high mail volume and can only print unfilled envelopes.

None of the aforementioned solutions allows the processing of filled envelopes having different thickness and different formats. The aforementioned publications do not disclose whether various mail carriers can be selected by the customer of the mail carrier or how an allocation therefor ensues in the accounting. It is also a problem as to how up-to-date data can be maintained for a number of carriers.

SUMMARY OF THE INVENTION

An object of the present invention is to eliminate the aforementioned disadvantages associated with known PC-based systems and to provide a mail processing system that is composed of physically separate components that enable a maximum adaptation to the customer's wishes, with the employment of security housing being reduced while still precluding a misuse for the purpose of a falsification of data of individual components as well as of the overall system.

In particular it is an object to develop, a more flexible mail expediting system having a mail processing machine that enables a utilization of services of various private and public mail carriers. The processing of filled postal matter having different thicknesses and different formats given, medium through high shipping quantities, should ensue with a machine base station.

The above objects are achieved in accordance with the principles of the present invention in a personal computer-based mail processing system having a machine base with a printing station adaptable to postal items of differing thicknesses, and having a specific interface unit, the printhead in the printing station being driven by printing control electronics. Components forming a service request arrangement for processing mail for at least one mail carrier are connected to the system bus of the personal computer. At least one security arrangement per mail carrier is provided, which includes an application-specific integrated circuit connected to the personal computer system bus via a parallel input/output interface, and which is connected to the printing machine base via at least one interface and a data cable. The interface and the application-specific integrated circuit of the security arrangement form a specific data transmission unit for fast data transmission between the security arrangement and a processing circuit in the specific interface unit of the base and/or the printing control electronics. The application-specific integrated circuit includes circuitry for implementing accounting and security functions for the (at least one) selected mail carrier. The hardware circuit is connected to non-volatile memory modules and to a security processor, which is programmed with at least one non-readable program portion in order to implement at least one of a number of security functions.

A printhead for purely electronic printing is driven by printhead electronics and, together with a transport unit, forms a printing station that is adaptable to varying thicknesses of postal items. In addition to enabling the processing of large quantities of mixed mail on the basis of filled envelopes, the invention enables PC-supported franking. Security against manipulation at the interface to the printing base is assured by specific measures in the personal computer and in the printing base, and may be enhanced by a security imprint corresponding to the demands made by the respective mail carriers. The data for the security imprint include a signature or marking that enables a verification of the printed postage value.

The invention proceeds a recognition that a secured housing is only required for specific components of the system. The system includes security circuits in the personal computer protected by a security housing that is connected to the system of the personal computer. Accounting and security functions are united in the inventive security arrangement. The accounting function of the security arrangement is based on a fast and manipulation-proof hardware accounting unit and non-volatile memory modules that do not require a supporting voltage for data preservation when the machine is turned off. Specific data transmission hardware and a specific, fast interface to the machine base station allow a specific control of at least the machine base station by the security arrangement, as a result of which a use of the machine base station without a connected security means is rendered impossible in the aforementioned way.

As a result of a software-based security module in the security arrangement, the system is equipped with high security against manipulation. A security processor, preferably an OTP (one-time programmable) processor is contained in the security arrangement and stores all security-relevant programs so as to be protected against readout. The security processor is programmed with at least one non-readable program part in order to execute at least one of a number of security functions. The security processor is connected to a modem via the parallel input/output interface of the security arrangement and via the PC system bus, or the security processor is connected to a modem via at least one serial interface of the security arrangement. The security processor is thus programmed with a non-readable program part that implements a manipulation-proof credit reloading into the mail registers that are formed in the non-volatile memory modules. Together with further programs stored in a program memory EPROM of the security arrangement, at least one security module is created that checks the authorization of the individual components and monitors the data transfer between personal computer and machine base station.

The personal computer with appertaining user programs and a beneficial user interface with keyboard and display unit comfortably allows more functions to be executed then could a meter of a postage meter machine. Thus, more and new services of the mail carriers can be requested for the mail processing. Advantageously, these user programs are utilized for operating the system under Windows® for a number of carriers as franking system, shipping system or postage valuation system. The program memory of the personal computer and/or of the security arrangement preferably contains a user program with a postage calculation routine on the basis of entered shipping data and on the basis of a weight entered manually or via a scale, or on the basis of input data for the indirect calculation of the weight. In a preferred embodiment, the postage calculation routine contains a sub-routine for determining the most beneficial mail carrier for the corresponding shipping or, respectively, conveying task. It has been proposed to utilize a computer-supported mail processing system with postage meter machines, and possibly with other mail handing devices, for the processing of a higher mail volume in a mail station for franking postal matter (German Patent Applications 196 17 586.0, 196 17 473.2, 196 17 476.7, 196 17 557.7, respectively corresponding to pending U.S. applications Ser. No. 08/850,805, Ser. No. 08/850,788, now U.S. Pat. No. 6,064, 994 Ser. No. 08/850,413 and Ser. No. 08/850,051 now U.S. Pat. No. 6,035,291 and assigned to the same assignee as the present application). The mail carriers are selected in the office by the user via the user interface of the personal computer, and are printed on the letter as bar coded information. The bar code can be scanned in the remote mailing station via a scanner. The accounting ensues via software in the postage meter machine to which a modem is also connected for updating the postage fee schedules. The updating of the schedules ensues automatically in collaboration with a data center.

Differing therefrom, the invention undertakes an accounting via hardware in at least one security arrangement in the personal computer. The accounting is undertaken for a mail carrier selected from a number of mail carriers. To this end, a service request unit for mail processing for at least one mail carrier is connected to the PC system bus, and at least one security arrangement is equipped with a user-specific hardware circuit that implements the accounting related to a mail carrier in associated, non-volatile memory modules.

Alternatively, one or more separate security inserts (one insert per mail carrier or one insert for a group of mail carriers) can be inserted into a slot of a personal computer.

The security arrangement includes at least one software-based security module in the security processor or in the program memory and at least one fast interface. A software-based security module in the security processor is provided, for example, for generating data for a security imprint or for producing security during printing. Each of the software-based security modules is based on a non-readable program part in the security processor. A number of software-based security modules can likewise be utilized for different mail carriers and purposes. A software-based security module in the security arrangement can be entirely customized to the requirements and demands of a specific mail carrier. The security processor of the security arrangement enters into a communication connection with a modem and is programmed with a non-readable program part that implements a manipulation-proof credit reloading in to the mail registers that are fashioned in non-volatile memory modules.

The security arrangement is connected via a first data cable and via a processing circuit of the specific interface unit and/or of the printhead electronics in the machine base station for the control of a printing station adaptable to postal matter thickness. The security arrangement preferably includes a fast serial interface for the connection to the printhead electronics in the machine base.

Tampering with the machine base is already made more difficult by the specific interface. Additional, specific measures guarantee security against an unauthorized manipulation. The legitimacy numbers for the allowed security arrangement are stored in the user program of the personal computer, or an identification of what security component must be accessed in order to implement the accounting for a selected mail carrier are listed therein. The allowed printer devices or the printer devices suitable according to the respective user program are listed in the user program of the personal computer and in a program module of the security arrangement. Routines in order to be able to mutually check the authorization are stored in the user program of the personal computer and in a program module of the security arrangement. The personal computer thereby checks whether the security arrangement allocated to the respective user program or to the respective mail carrier is connected, and whether the machine base station allocated to the respective user program is connected. If not, the respective user program cannot be activated. Moreover, a check in the machine base can likewise ensue with respect to an authorization of the security arrangement. Tampering with the machine base can only be prevented in this way. It is thus not possible to operate the specific machine base with a different computer, i.e. without a connected, authorized security arrangement, in order, for example, to fraudulently produce franking imprints that have not been accounted for.

The security of the inventive mail processing system is based on two measures that, first, are directed to the operating mode of the security arrangement and, second, are directed to the operating mode of the franking printer. The security arrangement is thereby protected against manipulations of the postage fee accounting, whereas the franking imprint of the franking printer is protected against forgeries. The security of the security arrangement, by contrast to a pure PC solution, is based on specific hardware. This specific hardware in fact has an interface to the PC system bus.

Beyond this level of security, no access is possible to the postage accounting program or to some other, security-relevant program, or to security-relevant data or to the postage memories, in order to write data. The security-relevant data can only be read out or—for example, in the course of a credit reloading—used or modified by the processor of the security module. The identity of the security module is given by a customer-specific or machine-specific key, which cannot be read out, and by means of the previously cited interrogatable legitimacy number. The accounting data can only be read out by the processor of the personal computer, for example, for the purpose of display of the accounting data. The security arrangement itself can be protected by various measures. The simplest form of protection is to encapsulate the security arrangement in a container having a lead seal. An equivalent measure to cast the security-relevant hardware component such as, for example, the postage memory in casting material. A higher level of security against manipulation is achieved by a specific version of the security arrangement in the form of a application-specific integrated circuit (ASIC). At the output side, at least the print data and appertaining control data are emitted from the security arrangement to the machine base. All lines are advantageously combined to form a first data cable that may be equipped with an adapter and that is connected by a plug/socket to the specific interface unit of the machine base.

Together with further, individually controllable stations, the machine base forms a mail processing machine, whereby the individual, controllable stations are respectively connected to one another by a second data cable.

One individually controllable station of the mail processing machine can be an automatic delivery station for postal matter, connected via an interface to the machine base via the second data cable. In addition to driving the machine base, the personal computer equipped with the security arrangement also drives the automatic delivery station that is connected at the postal matter input side and applies an envelope or some other postal matter to the mail input of the machine base.

Another individually controllable station of the mail processing machine can be a dynamic scale, connected via an interface to the machine base via the second data cable.

In another version the individually controllable station is a dynamic scale and is connected by an interface to the machine base via the second data cable and to the security arrangement via a separate data cable.

In an alternative version the automatic delivery station is connected by an interface to the dynamic scale via a second data cable and the dynamic scale is connected by an interface to the machine base via the second data cable, and the machine base is connected by an interface to the security arrangement in the personal computer and via a first and separate data cable.

In addition to the hardware accounting unit for the implementation of an accounting function, at least one serial interface with means for the implementation of a security function is included in the user-specific hardware circuit of the security arrangement. This serial interface is equipped with a monitoring circuit that collaborates with the printhead electronics of the specific interface unit or with a processing circuit of the specific interface unit. The monitoring circuit can be operated in combination with a software security module.

The user-specific hardware circuit of the security arrangement preferably is equipped with a medium-speed, second serial interface that includes a sensor/actuator control with couplers for voltaic separation in order to control the machine base station together with further, individually controllable stations of the mail processing machine via the processing circuit of the specific interface unit. Opto-couplers preferably are utilized as the couplers.

Alternatively the user-specific hardware circuit of the security arrangement can be equipped with a medium-speed, second serial interface and with a slow, third serial interface, the medium-speed second serial interface including a sensor/actuator control and opto-coupler in order to control the machine base via the processing circuit of the specific interface unit. The slow, third serial interface includes a UART circuit and opto-coupler in order to control the further, individually controllable stations of the mail processing machine via a transmission circuit of the specific interface unit.

Preferably, the aforementioned first data cable and separate data cable are combined to form a common, first data cable connected via a plug/socket to the specific interface unit in the machine base. The transmission circuit of the specific interface unit includes an appertaining plug/socket for the data plug of the first data cable of the common data cable, and a level converter that implements a conversion in the machine base station from TTL signals for a V24 interface. The V24 interface is connected to a V24 jack.

DESCRIPTION OF THE PREFERRED EMBODIMENTS

Figure 1:
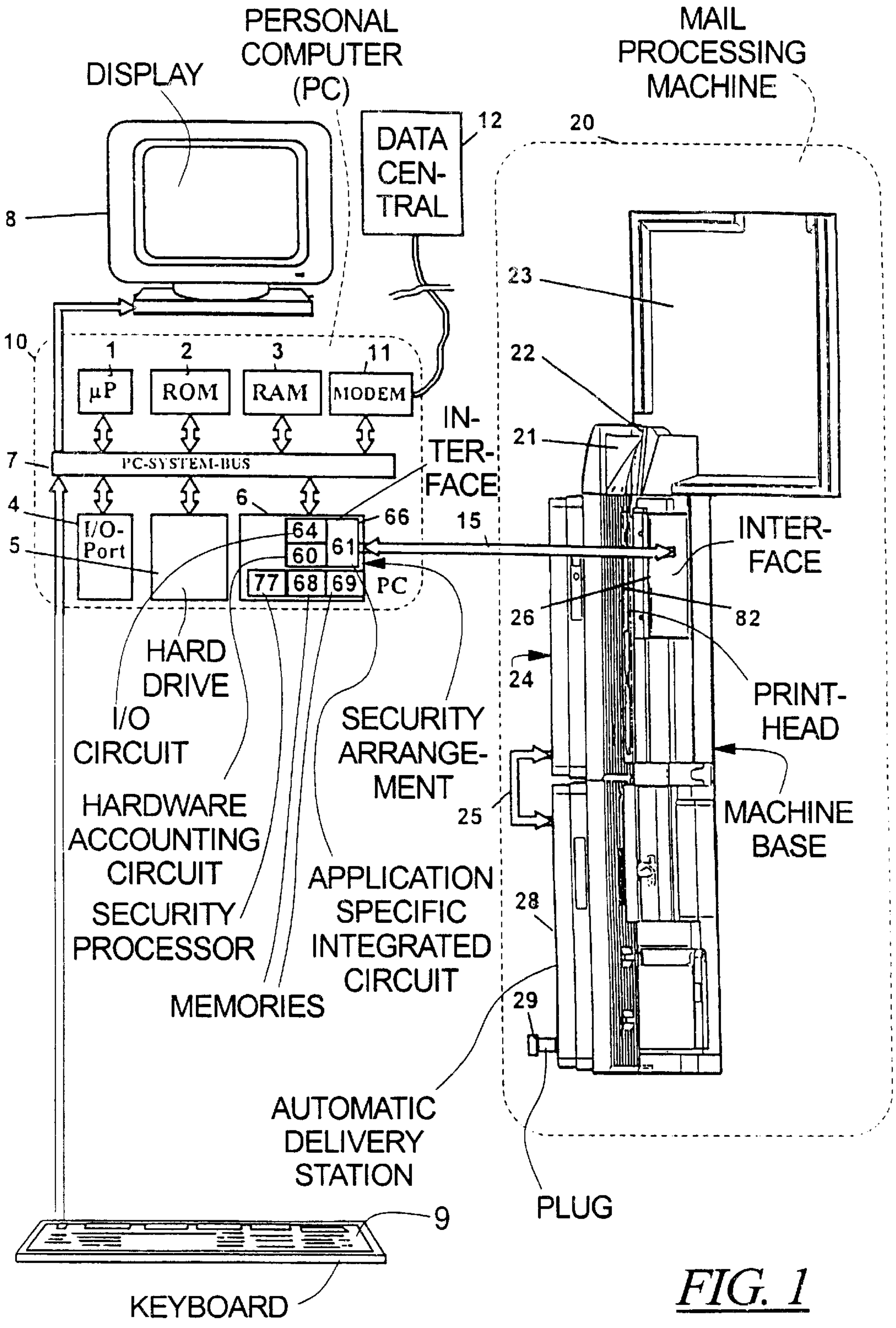
FIG. 1 is a block circuit diagram of a mail processing system with an automatic delivery station, with a machine base and with a personal computer having a security arrangement, constructed and operating in accordance with the invention.

The inventive mail processing system shown FIG. 1 contains an inventive security arrangement 6, and includes a personal computer 10 containing at least a microprocessor 1, a program memory 2, a main memory 3, an input/output port 4 and a disk drive 5. This structure is supplemented by display 8 and keyboard 9. Since the rest of the PC structure exhibits no special characteristics and is well-known, a more detailed description is not necessary.

Figure 6:
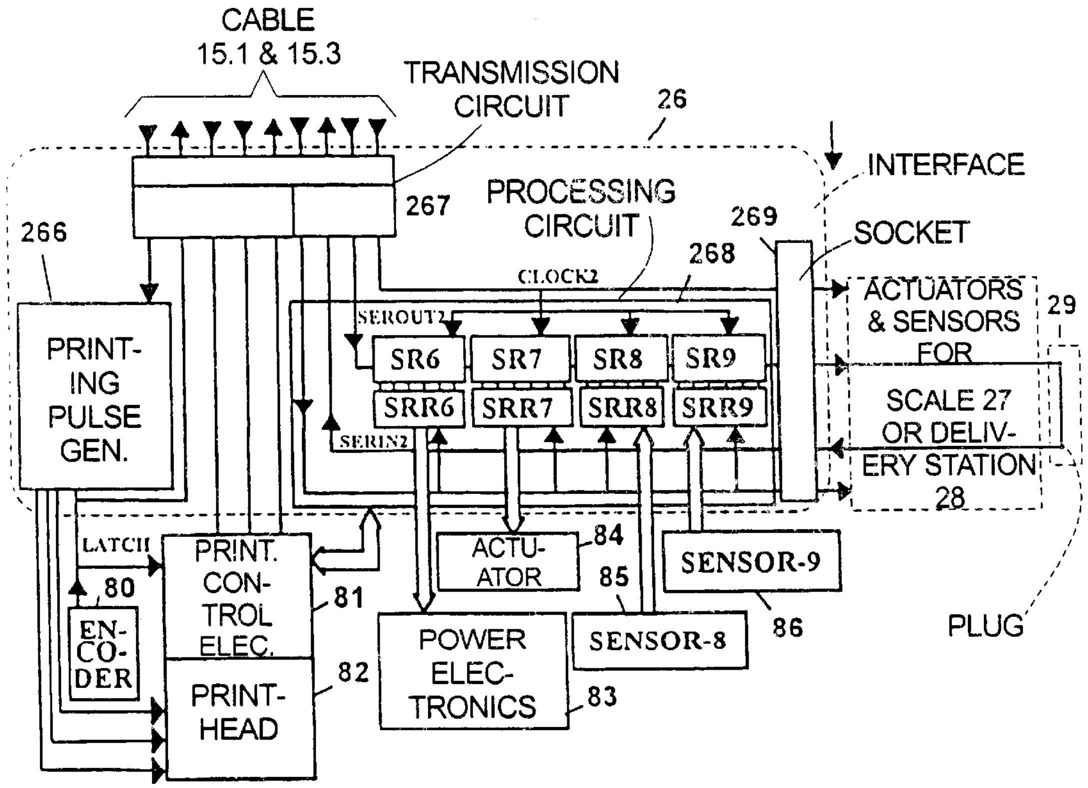
FIG. 6 is a block circuit diagram showing the specific interface unit in the machine base for two serial interfaces for connection to the second version of the security arrangement according to FIG. 5.
Figure 7:
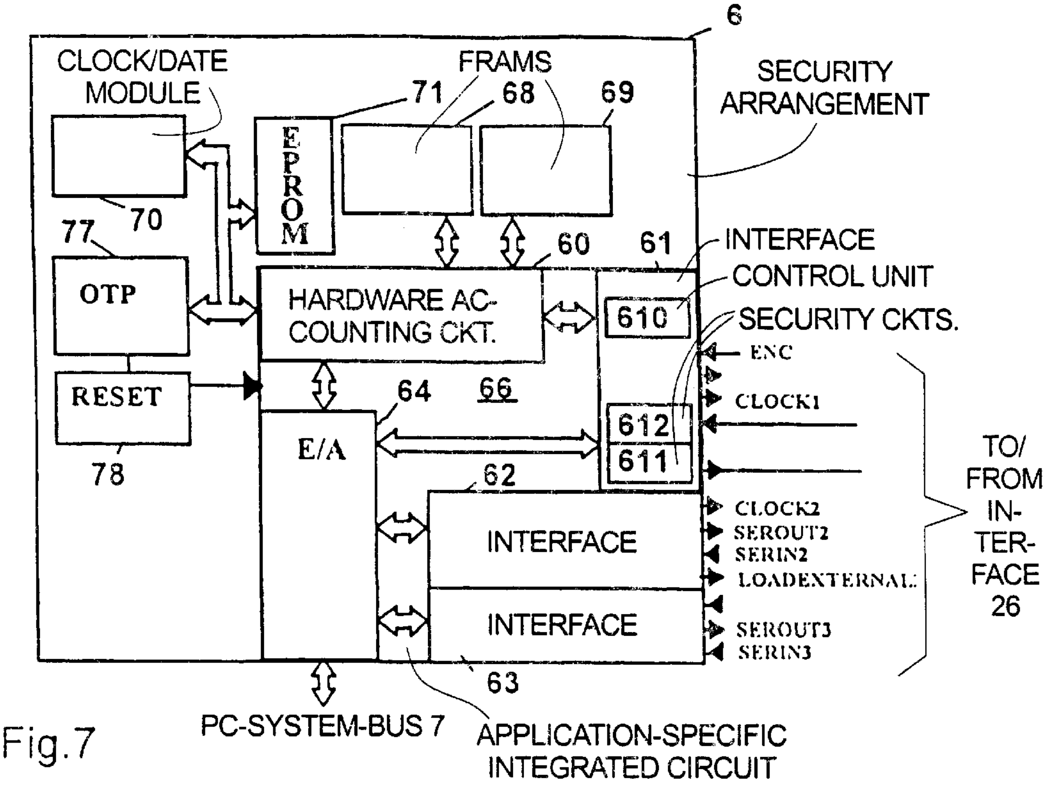
FIG. 7 is a block circuit diagram of a third version of the inventive security arrangement.

It is inventively provided that the security arrangement 6 is connected to the PC system bus 7 via a parallel input/output interface 64 and is connected to the printing machine base 24 via at least one serial interface 61 and/or (see FIGS. 5 and 7) 62 and/or 63 (See FIG. 7). The serial interface 62 (if employed) is a specific data transmission unit for the fast, serial data transmission to the specific interface unit 26 and to the printhead electronics 81 (see FIGS. 6 and 8) in the machine base 24.

The inventive security arrangement 6 includes the system interface which is mechanically and electrically required for coupling to the PC system bus 7 and is preferably operated in one of the free plug-in locations of the personal computer 10. The coupling of the personal computer 10 to the system bus 7 enables a fast data throughput as a result of the parallel data transmission based on the clock rate of the microprocessor 1. The security arrangement further includes a fast, manipulation-proof, specific interface at least for the output of the print data to the printhead 82 in the machine base 24. Likewise, a fast, manipulation-proof, specific interface 26 is provided at least for reception and forwarding of print data to the franking printhead 82 in the base 24. The two aforementioned interfaces are connected via a data cable 15.

Together with further, individually controllable stations 27 and 28 (See FIGS. 2*a*–2*d*), the machine base 24 forms a mail processing machine 20, with the individually controllable stations 27 and 28 being connected to one another by an interface with data cable 25.

The mail processing machine 20 is shown in a plan view at the right in FIG. 1. The mail processing machine 20 is shown in a perspective view in FIG. 10; however, the machine base 24 is combined with a meter 40 in FIG. 10. Alternatively, the meter can be fashioned as a lap top computer and the machine base 24 can be fashioned as a docking station onto which the lap top, equipped with at least one security arrangement, is plugged. Preferably, the lap top has the full functionality of a personal computer.

Figure 10:
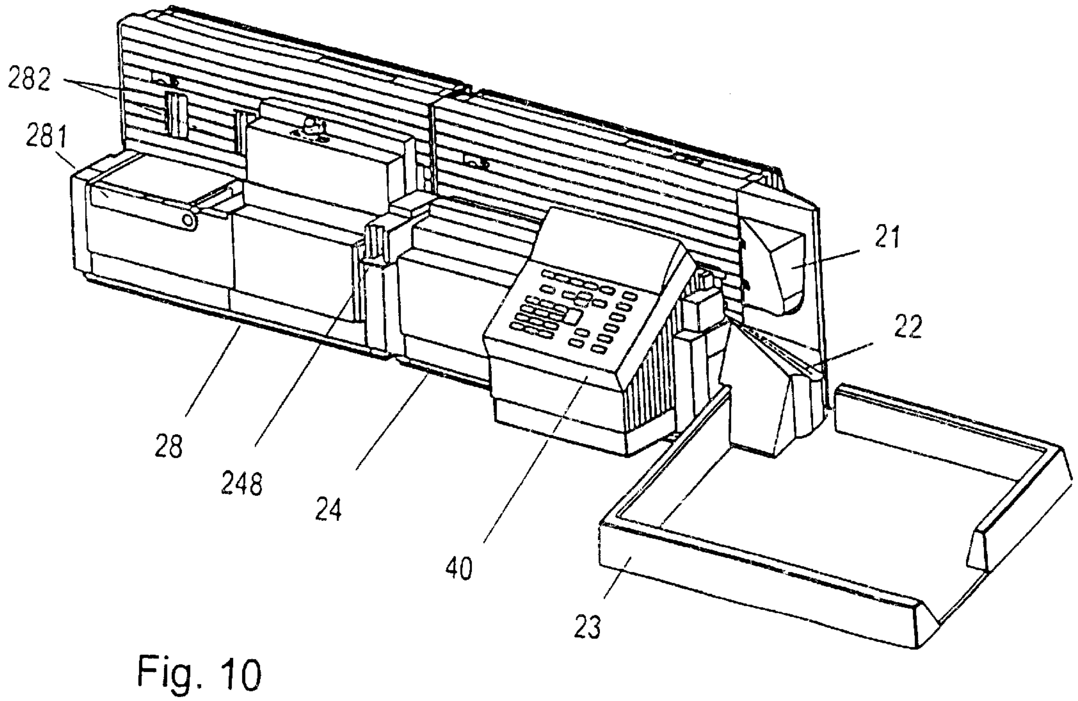
FIG. 10 is a perspective view of a mail processing system with a meter in which the invention can be employed.

In FIG. 1, the aforementioned personal computer 10 equipped with the security arrangement 6 serves as a postage meter. An automatic delivery station 28 is connected to the postal matter input side. The automatic delivery station 28 should automatically apply an envelope to the mail input of the machine base 24. The automatic delivery station 28 may include an automatic letter moistener and closing apparatus (not shown). As shown in FIG. 10, the postal matter to be franked is vertically placed on a seating surface. The stack of postal matter to be franked is resiliently pressed against a stop face with a pivotable pressure arm 281, delivery rollers 282 driven with a motor projecting therefrom. The delivery roller 282 effects a separation of the individual mailings and is disclosed in greater detail in German Application 196 05 017.0 corresponding to co-pending U.S. application Ser. No. 08/790,978 now U.S. Pat. No. 5,954, 324.

Figure 9:
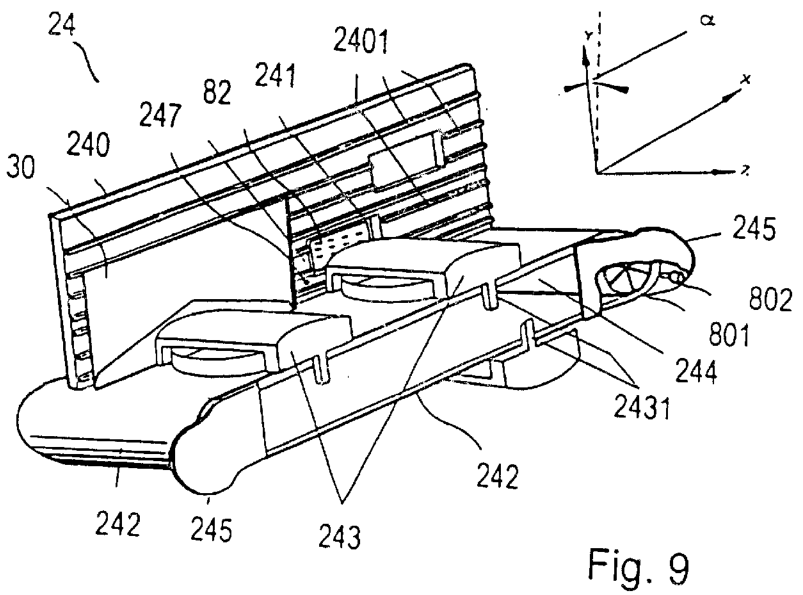
FIG. 9 is a perspective view of a fast, specific transport unit in the machine base of the invention.

The machine base of the mail processing machine 20 is explained in greater detail with reference to FIG. 9. Therein, the envelopes and similar postal matter are conveyed to the franking printing station of the machine base station 24 on edge, inclined slightly backwardly, with the assistance of a circulating conveyor belt 242 equipped with pressure elements 243. The conveyor 242 with the pressure elements 243 is driven via drum 244 and forms the conveyor unit of the machine base 24. The conveyor unit 242 through 244 of the machine base forms the franking printing station together with the franking printhead 82. The start of the envelope is recognized by a sensor 247 immediately preceding the franking printing station. An optical sensor 247 is preferably arranged in a dyed plate 240. The envelope 30 or packages or franking tapes are conveyed respectively preceding, within and following the franking printing station by the conveyor unit 242 through 244. The envelopes lie against the guide plate 240 in which at least one window 241 is provided and in which at least one ink printer head 82 is permanently installed for printing. When the conveyor belt 242 with the pressure elements 243 is moved, an incursion part 245 or an excursion part 246 engages into projections of the pressure elements 243 in order to form a clamp for the envelope 30 or to open supplied or discharged envelopes. Such a machine base station for a postage meter machine is disclosed and described in greater detail in German Applications 19 605 014 and 19 605 015.

The envelope 30 is conveyed in the machine base station 24 by the conveyor belt 242 in the aforementioned way and is printed on the side facing away from the observer. Preferably, the mail processing machine 20 is supplemented by a deposit 23. Given employment of a conventional deposit, the envelopes would lie with their printed side down, so that ongoing, visual control is not possible. German Application 197 05 089.1 discloses an arrangement for the deposit of recording media with which a reliable guidance of envelopes—which can also be of different sizes and different thicknesses and a turn-over of the envelopes is achieved, so that the franking imprint of the deposited envelope is easily visible. The envelope passes behind the printing station, along a chute 22, and is deflected by a rocker 21 in order to then drop into the receptacle of the deposit 23. For franking thick postal matter, the mail processing machine 20 additionally has a tape dispenser 248 (shown in FIG. 10) for self-adhesive franking tapes.

Figure 2A:
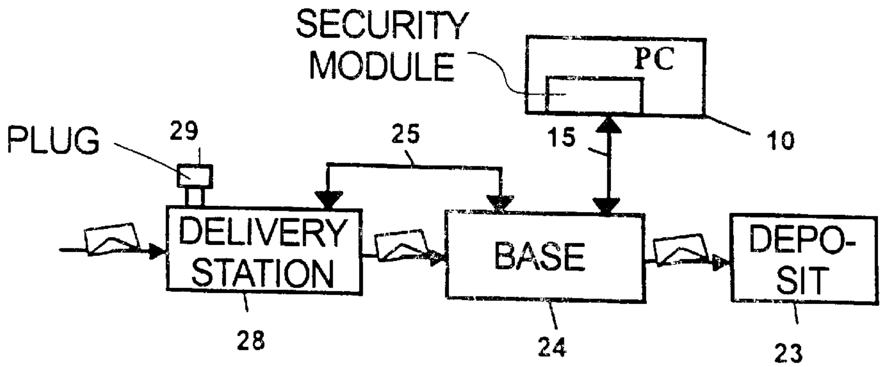
FIG. 2*a* is a schematic diagram of an inventive mail processing system in the version according to FIG. 1.
Figure 4:
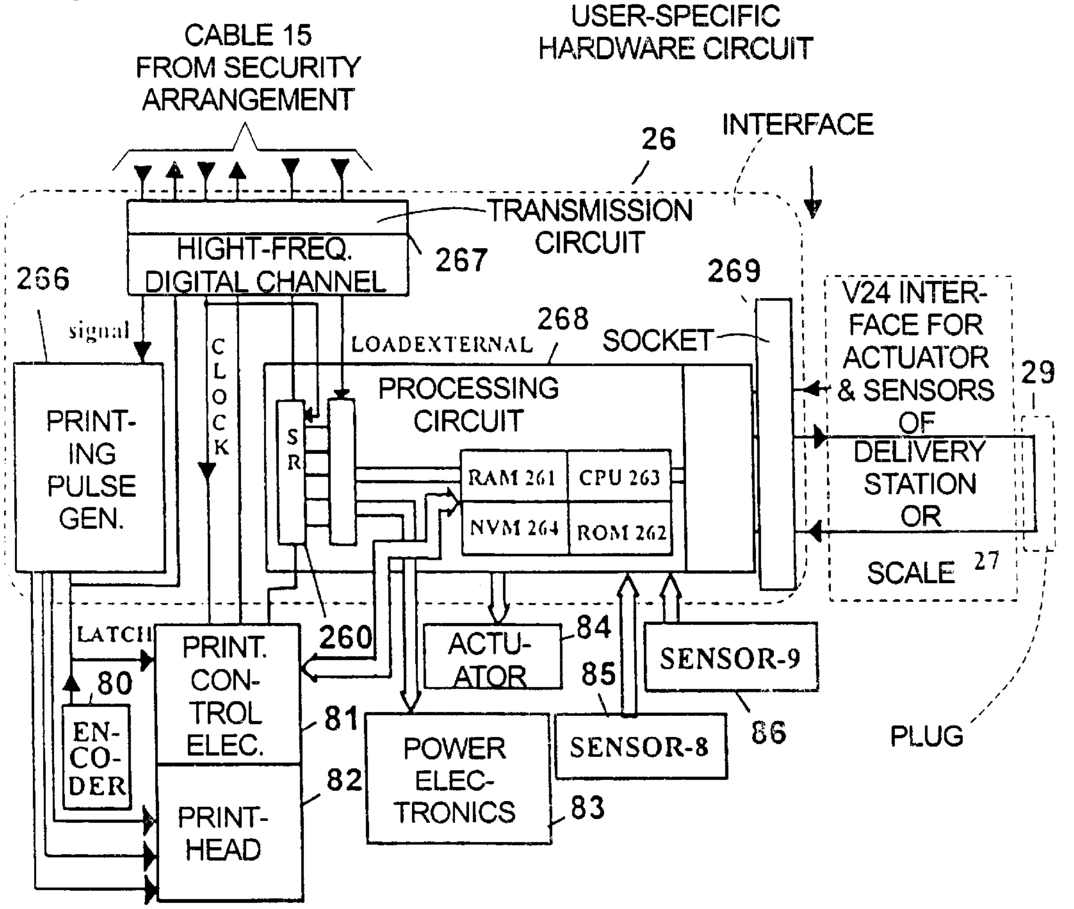
FIG. 4 is a block circuit diagram showing the specific interface unit in the machine base for a serial interface for connection to the first version of the security arrangement according to FIG. 3.

FIG. 2*a* shows a general, schematic circuit diagram for the version of the mail processing system according to FIG. 1. The mail processing machine 20 is composed of the automatic delivery station 28, the machine base 24 and the deposit 23. The mail processing machine 20 is connected via a first data cable 15 to the security arrangement 6 that, as a PC insert, has exteriorly accessible terminal contacts (not shown) for data cables. The franking printing station thus does not have a meter but only a machine base and franking printing means (i.e., print control electronics 81 and printhead 82 as shown in FIG. 4), as well as further components explained below with reference to FIG. 4. The accounting function, which would conventionally take place in a meter is assumed in accordance with the invention by the security arrangement 6.

The individually controllable station 28 is an automatic delivery station for postal matter and is connected by interface to the machine base 24 via a data cable 25.

The personal computer 10 equipped with the security arrangement 6 thus controls the machine base 24 and the automatic delivery 28 that is connected to the input side for postal matter and automatically applies an envelope to the mail input of the machine base 24. The check functions that a meter would otherwise would have to implement are also inventively assumed by the security arrangement 6 that is arranged in the personal computer 10. The components of the security arrangement 6 alternatively can be physically distributed among the numbers of modules inserted in the personal computer 10. The stations 28 and 24 could not be operated without a security arrangement 6, i.e., they could not be operated only with a computer 10.

Now that a computer 10 can be employed in a reliably secure manner, the entire functionality of a personal computer 10 is available for assisting in mail preparation. The system is improved in view of some properties as a result, particularly in view of operating ease compared to a system using a meter. For example, the system can now also be applied to a number of different carriers, particularly private (i.e., non-governmental) mail carriers. Freight or packages can also be processed when an appropriate user program is called.

Alternatively, such a security arrangement 6 can be arranged in a meter of a postage meter machine, as disclosed in German Application 196 03 467.1. FIG. 10 shows a view of a mail processing system with a meter 40 instead of the personal computer 10. The utilization of the services of other mail carriers, such as private carriers is limited due to the lower memory and data processing capacity of a meter 40 compared to the personal computer 10. Because of the limited display and input possibilities associated with a meter 40, employment of a meter-based postage meter machine for private mail carriers can ensue only to an extremely limited extent. The inventive system, by contrast, is not so limited. There is the possibility of equipping a meter with a comfortable display in the fashion of a lap top and computer keyboard and with the functionality of the personal computer as well as with the inventive security arrangement 6. Such a meter version, however, would be more expensive than an insert for a personal computer and would also require a service technician for changing the security arrangement 6 for different private mail carriers.

Figure 2B:
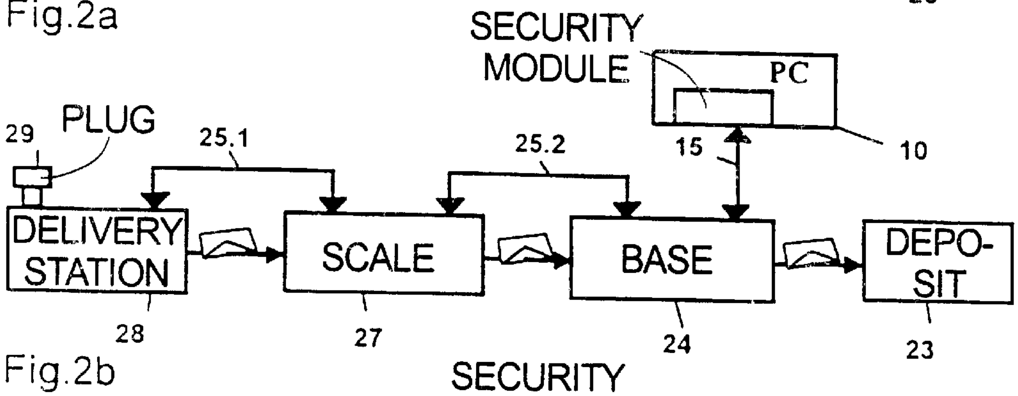
FIG. 2*b* is a schematic diagram of an inventive mail processing system in an expanded version with an automatic delivery station, a dynamic scale, a machine base and a personal computer.

FIG. 2*b* shows an expanded version of the inventive mail processing system as a schematic diagram. The system has an automatic delivery station 28 supplemented by a dynamic scale 27, a machine base 24 and a personal computer 10. The automatic delivery station 28 separates envelopes from a stack and supplies them to the machine base 24, i.e. it serves as letter delivery stage. If the envelope stack contains letters of different weights that respectively require different postage, the additional employment of a dynamic scale 27 becomes meaningful in order to identify the respective letter weights. The dynamic scale 27 allows a higher throughput of different postal matter (mixed mail) for an automatic mail processing.

According to the expanded version (FIG. 2*b*), the letter weight is indirectly reported from the scale 27 to the security module 6. The weight data are first sent from the scale 27 via the second data cable 25.2 to the machine base 24 and are sent from the latter to the security module 6 on the already existing line of the first data cable 15. It is again advantageous here that the operation thereof can be controlled by itself only via a specific connection from the security module 6 to the envelope processing unit 20 and a monitoring as to the proper operation thereof is enabled in the security module 6.

Figure 2C:
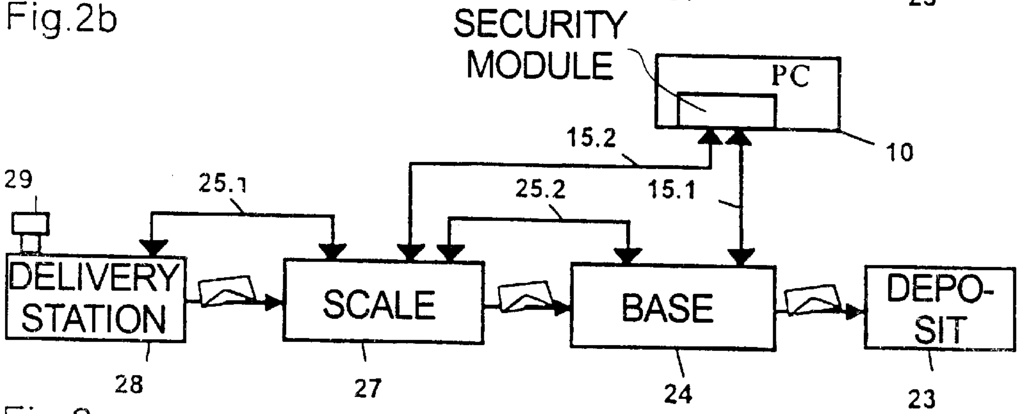
FIG. 2*c* is a schematic diagram of an inventive mail processing system in an alternative version having an automatic delivery station, a dynamic scale, a machine base and a personal computer with the dynamic scale being directly connected to the personal computer.

FIG. 2*c* shows an alternative version of the mail processing system as a schematic diagram. It is equipped with an automatic delivery station, a dynamic scale 27, a machine base 24 and a personal computer 10, but the dynamic scale 27 is directly connected to the personal computer 10 with a separate, first data cable 15.2. The personal computer 10 is again equipped with the security module 6. The dynamic scale is an individually controllable station 27 and is therefore connected by interface to the machine base 24 via a second data cable 25.2. The machine base 24 is likewise connected by interface to the security module 6 via the first data cable 15.1, so that all monitoring jobs can be implemented with the security module 6.

The letter weight in the alternative version (FIG. 2*c*) is reported directly to the security module 6, which is equipped therefor with a separate interface such as the UART and opto-coupler 63, similar to that shown in FIG. 7. The correct franking value is calculated on the basis of stored postage tables, this being debited by the security module 6. The print data are formed by the application program and are transmitted to the franking printhead 82 via the security module 6, so that the franking value separately calculated therefor is, for example, printed onto the corresponding shipping item in the franking printing station. In this application, the speed advantages of the inventive franking apparatus take full effect.

In an alternative embodiment, the calculation of postage is not implemented by the personal computer 10 but by the security processor of the security module 6, whose structure and clock rate enable a calculation in the millisecond range.

The data transmission link from and to the printhead electronics 81 of the franking printhead 82 is specifically designed for the transmission of the data formats. It is thus faster by at least two powers of ten than data transmissions via the second data cables 25.1 and 25.2 with standard interfaces such as, for example, with a V24 interface. A maximum letter throughput can thus be assured even given changing letter weights. In the expanded as well as in the alternative version, the personal computer 10 implements the postage calculation—with the involvement of the security module 6—according to the desired service of a selectable mail carrier based on current schedules.

Figure 2D:
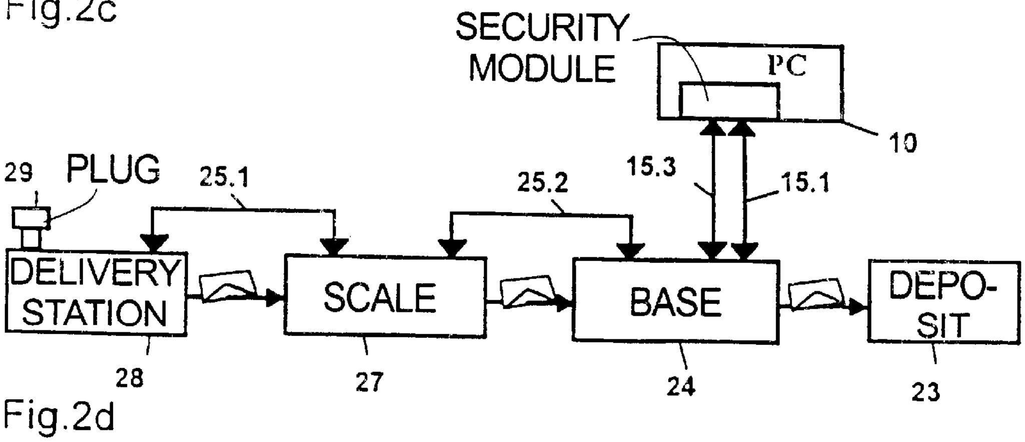
FIG. 2*d* is a schematic diagram of an inventive mail processing system according to the preferred embodiment with an automatic delivery station, a dynamic scale, a machine base and a personal computer, with the dynamic scale being connected to the personal computer via the machine base.

FIG. 2*d* shows a schematic circuit diagram of a mail processing system according to the preferred embodiment. It is equipped with an automatic delivery station 28, a dynamic scale 27, a machine base 24 and a personal computer 10. In this version the dynamic scale 27 is connected to the personal computer 10 via the machine base 24. Even though the data of the dynamic scale 27 are supplied via a third serial interface of the security module 6, the postage calculation does not ensue in the security module 6 but in the personal computer 10 based on the user program. The user program stored in the program memory of the personal computer 10 likewise controls the functions of the individually controllable stations 27 and 28 with the entire data traffic being sequenced via the security module 6. The individually controllable stations 27 and 28 are respectively connected by interface to one another with second data cables 25.1 and 25.2, with a V24 interface preferably being utilized.

The automatic delivery station 28 is thus connected by interface to the dynamic scale 27 via data cable 25.1, and the dynamic scale 27 is connected by interface to the machine base 24 via data cable 25.2. The machine base 24 is again connected by interface to the personal computer 10 equipped with the security module 6 via a separate, first data cables 15.1 and 15.3. The data cables 15.1 through 15.3 can be combined to form a common, first data cable 15 that is connected to the specific interface unit 26 in the machine base 243 via a plug/socket. All data cables and interfaces, of course, are equipped with appropriate terminal contacts.

The machine base 24 inventively includes a printing station as described above in connection with FIG. 9 adaptable to postal matter thickness, and a specific interface unit 26. The printhead 82 driven by the printhead electronics 81 (See FIG. 8) together with a conveyor formed by components 242 through 244 (see FIG. 9) forms the printing station adaptable to postal matter thickness. The service request components 1, 2 and 9 are connected to the PC system bus 7 for mail processing by at least one mail carrier. At least one security arrangement 6 is provided per mail carrier, such as one security module 6 per mail carrier, and the security arrangement 6 includes an ASIC 66 that is connected to the PC system bus 7 via a parallel input/output interface 64, and to the printing machine base 24 via at least one of the interfaces 61, 62 and/or 63 and a first data cable 15. At least one of the interfaces, such as interface 61, in the ASIC 66 is fashioned as a specific data transmission unit for fast data transmission between the security arrangement 6 and a processing circuit 268 of the specific interface unit 26 and/or the printhead electronics 81 in the machine base 24. The ASIC 66 for the implementation of accounting and security functions for at least one selected mail carrier. The hardware circuit 66 is connected to non-volatile memory modules 68 and 69 and to at least one security processor 77 that is programmed with at least one non-readable program part in order to implement at least one of a number of security functions.

The invention is explained in greater detail for the following three exemplary embodiments with reference to FIGS. 3–8.

Figure 3:
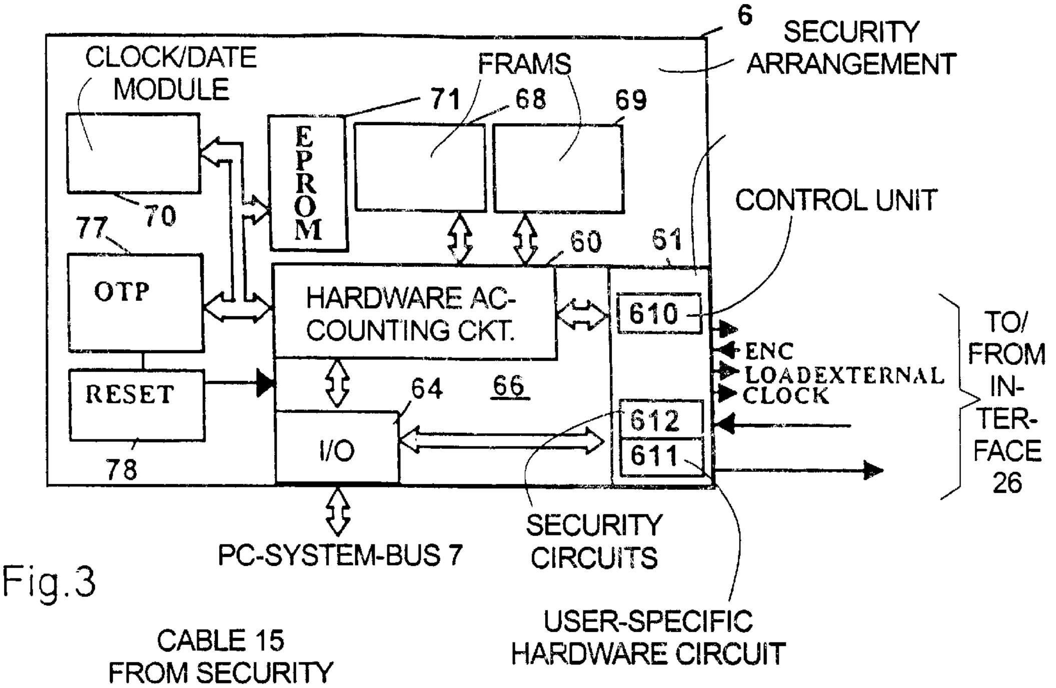
FIG. 3 is a block circuit diagram of a first version of the inventive security arrangement.

The security arrangement 6 shown in FIG. 3, which may be in the form of a security module includes a program memory EPROM 71, a (security) OTP processor 77, and input/output circuit 64 as the system interface to the PC system bus 7 (see FIG. 1), a specific data transmission and monitoring unit in the fast, first serial interface 61, a hardware accounting unit 60 and non-volatile memory modules 68 and 69. For protection against manipulation, the security arrangement 6 contains a ASIC 66 for the implementation of accounting and security functions. The ASIC 66 is advantageously realized with a user-specific circuit (ASIC) and is therefore manipulation-proof. The hardware circuit 66 is connected to the non-volatile memory modules 68 and 69 and to the security processor 77 that is programmed with a non-readable program in order to implement at least one of a number of security functions. In one version, the security processor 77 is connected via the parallel input/output interface 64 of the security arrangement 6 and the PC system bus 7 to the modem 11, and that the security processor 77 is programmed with a non-readable program part that implements a manipulation-proof recrediting into the postal registers that are formed in the non-volatile memory modules 68 and 69. In another version, the security processor 77 is connected via at least one serial interface 61, 62 and/or 63 to the modem 11, and the security processor 77 is programmed with a non-readable program part for recrediting. The security processor 77 is preferably a microcontroller of the type DS83C520-CPU with a 16 Kbyte internal program memory for a corresponding, non-readable program part, or other software-based security modules.

The non-volatile memory modules 68 and 69 are preferably FRAMs preferably of the type FM1208S of the Ramtron company that require no supporting voltage for preserving data when the machine is turned off. The access to the non-volatile FRAM memory area is controlled by the application-specific integrated circuit 66 (ASIC). The microcontroller can access the entire memory area of the FRAMs 68 and 69 in writing and reading fashion. A specific cryptographic key for Data Encryption Standard (DES) or similar encryption methods are employed in the internal program memory of the microcontroller 77 for the decoding of the program data that are loaded into the non-volatile FRAM memories 68 and 69 of the security arrangement 6 during the initialization via the hardware circuit 66. These security-relevant program data are stored in the memory areas that are not accessible from outside the security arrangement 6. The clear text of the program, accordingly, is only available in the security arrangement 6. The other components of the system or of the personal computer 10 offer no possibility for interpreting the internal program parts. The hardware circuit 66 (ASIC) assures that only the lower halves of the address space of the FRAM memories 68 and 69 can be accessed externally. The upper halves of the address space of the FRAM memories 68 and 69 remain externally inaccessible, so that, for example, a DES key and the secret numbers for remote valuation for credit reloading as well as further instructions for further security measures can be stored therein in the form of program modules.

Additionally, reset logic 78 is provided in the security arrangement 6 in order to detect the voltage increase when the personal computer 10 is turned on and in order to switch the security arrangement 6 into a defined starting condition. When the hardware unit 60 has implemented the accounting, an enable signal F is forwarded to a control unit 610 in the specific data transmission and monitoring unit of the fast, first serial interface 61. The control unit 610 activates a shift register in the first serial interface 61 that is charged with parallel data from the PC system bus 7 via the input/output unit 64 in order to implement a parallel-to-serial conversion, so that the data are serially transmitted to the interface 26 and the print control electronics 81 in the machine base 24. A basic description of such a security arrangement 6 is found in German Application 196 03 467.1 entitled "Frankiermaschine." (U.S. application Ser. No. 08/788,188)

Optionally, the security arrangement 6 can also be equipped with a clock/date module 70 in order to meet postal regulations that forbid postdating of mail. A method for date setting that as disclosed in detail in published European Application 745 958 can be employed after the system is turned on.

Inventively, a first security circuit unit 611 and a second security circuit unit 612 are provided in the first serial interface 61 as components of the specific data transmission and monitoring unit. The first security circuit unit 611 is provided in order to attach further data to the data to be serially transmitted and/or to at least partially encode the aforementioned data. The second security circuit unit 612 is provided in order to interpret the serially received, communicated data after their serial-to-parallel conversion while or before these are applied to the PC system bus 7 via the input/output unit 64. The specific data transmission and monitoring unit thus forms a specific serial interface 61 that is fast and manipulation-proof and allows a print monitoring. This specific interface 61 includes opto-couplers (not shown in detail) at the output side for voltaic separation and has appropriate terminal contacts.

Together with the hardware of the specific data transmission and monitoring unit in the first serial interface 61, the security-relevant programs that are stored in the OTP processor 77 and further programs stored in the program memory EPROM 71 of the security arrangement 6, a security module is created that monitors the data transfer between personal computer 10 and machine base station 24 according to a large variety of criteria. A manipulation of the print data is thus rendered significantly more difficult, or practically impossible.

Whereas the stations 27, 28 and 24 of the mail processing machine 20 communicate with one another via a serial V24 interface and data cables 25 or 25. 1, 25.2 with a data rate of, for example, 9600 Bd, a significantly higher data rate is achieved with data cables 15 and 15.1 and a manipulation-proof, specific TTL high-speed interface. In addition to allowing the transmission of printing data, this also allows the transmission of further data for a communication with the mail processing machine 20, particularly with the machine base 24. For example, a data rate of approximately 1,000,000 Bd is achieved in the data transfer between personal computer 10 and machine base station 24.

FIG. 4 shows a fast, specific interface unit 26 in the machine base 24. The specific interface unit 26 in the machine base 24 has a high-speed channel and a printing pulse generator 266. An input of the high-speed channel is connected to the printing control electronics 81 and to the printing pulse generator 266 at the input side together with an encoder 80 and is connected at its output to the printhead modules of the printhead 82. At least one print signal is applied to the printing pulse generator 266 via the high-speed channel when the sensor 247 (See FIG. 9) detects the start of an envelope or other postal matter, or the start of a franking tape.

Shift registers connected to a shift register SR of the transmission circuit 260 are arranged in the printhead electronics 81, these being coupled to the serial high-speed channel in order to at least receive the print data of a printing column and in order to send status reports.

The specific interface unit 26 includes a fast transmission unit 260 for the serial-to-parallel conversion of communicated data that relate to the control and of sensor data and status data to be communicated that are required for the control. The fast transmission circuit 260 with a shift register SR and a data buffer is a component of a processing circuit 268 that receives parallel sensor data for the machine base 24 and also transmits parallel actuator data, and is also fashioned for the communication of data from and to further stations of the mail processing machine 20. The processing circuit 268 is equipped with a V24 interface for this latter purpose, a socket 269 for plug-in contacts being connected thereto. A plug with the second data cable 25 is plugged into the socket 269, this second data cable 25 leading to a further station of the mail processing machine 20.

The printing control electronics 81 is connected to the encoder 80 which emits a signal corresponding to the letter conveying speed. FIG. 9 shows a machine base 24 having components 242–244 for upright letter transport and the franking printhead 82. The encoder 80 in this embodiment is formed by an incremental (stepped) generator disk 801 that interacts with a photocell 802 and is coupled to the drive drum 244.

The encoder signal is communicated to the security arrangement 6 via the high-speed channel. A CLOCK signal for the shift registers of the high-speed channel is communicated from the security arrangement 6 via the high-speed channel to the fast, specific interface unit 26 and to the printing control electronics 81 in the machine base 24. The shift register SR of the fast transmission circuit 260 outputs data in parallel to the processing means in the processing circuit 268.

The transmission circuit 260 contains further registers (not shown) for data buffering, and the processing circuit 268 may contain an automatic status unit (state machine) and further means for communication with the security arrangement 6.

It is advantageously possible to utilize an intelligent processing circuit 268 composed of a main memory RAM 261, a program memory 262, a central processing CPU 263, and a non-volatile memory NVRAM 264 for an intelligent sensor/actuator control. The security arrangement 6 itself then need not include an actuator/sensor control, but merely has to communicate required instructions from the application program to the base 24. To this end, the fast transmission circuit 260 contains at least one shift register SR connected to the serial channel of the printing control electronics 81 in order to receive instructions and other data intended for the machine base 24 or for the other stations of the mail processing machine 20 or in order to send data derived from these stations to the security arrangement 6.

Dependent on the interpretation of the incoming signals via the V24 interface and the sensor/actuator electronics 268, the CPU 263 can generate an interrupt signal and supply it as an output to the security arrangement 6. The data communicated from the stations of the mail processing machine 20 are subjected to a pre-processing, so that only the most necessary data sets need be communicated to the security arrangement 6 from the specific interface unit 26.

A base identification number is stored in the program memory ROM 262 in addition to the appertaining program. A non-volatile memory of the printing control electronics 81 contains the identification number of the printhead and may also contain further specific data for the operation of the printhead 82. The sensor/actuator electronics in the processing circuit 268 is connected to the non-volatile memory (not shown) of the printing control electronics 81 via data and control lines. The memory and processing components 261 through 263 are utilized for the mutual checking of the authorization of security arrangement 6 and the specific interface unit 26 and/or of the printhead 82, preferably by means of a standard method. The processing circuit 268 is also in communication via a bus with power electronics 83.

Figure 5:
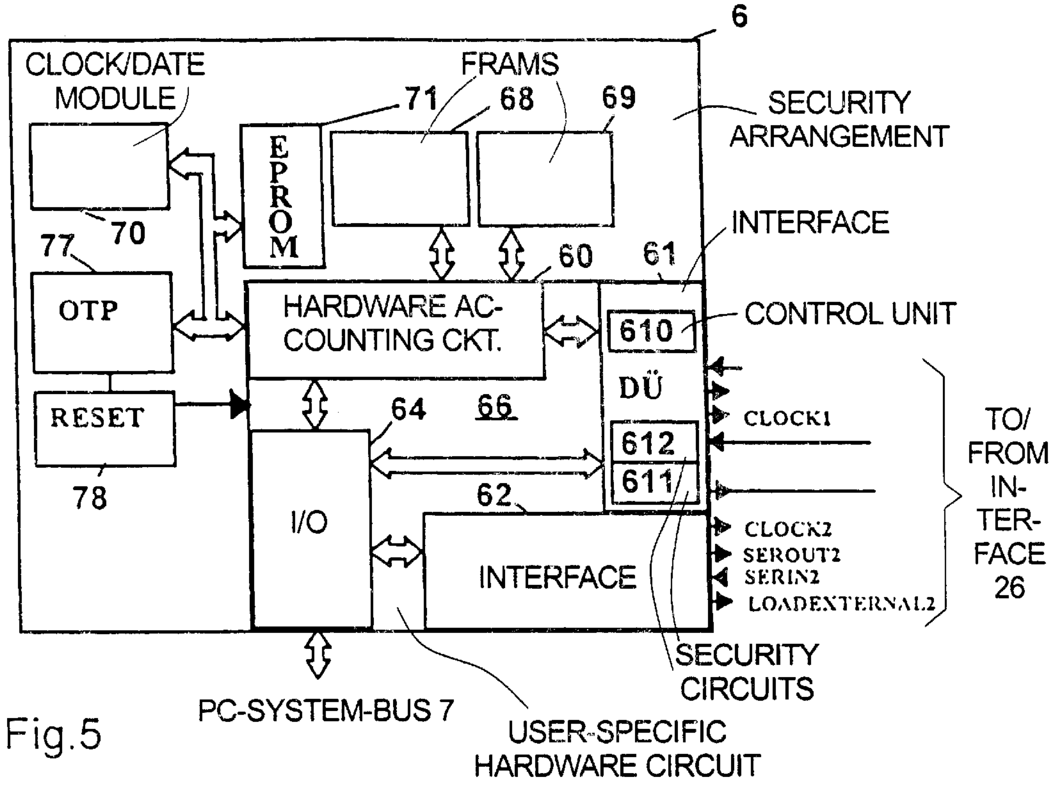
FIG. 5 is a block circuit diagram of a second version of the inventive security arrangement.

The block diagram of a second version of the security arrangement 6 shown in FIG. 5 differs from the first version on the basis of the provision of a second interface 62 that contains circuitry for the actuator/sensor control and which has opto-couplers at the output side for voltaic separation. The actuator/sensor control circuitry is implemented in hardware, preferably as a component of an ASIC, and is disclosed in greater detail in published European Patent Application 716 398. Differing from European Application 716 398, the actuator/sensor control circuitry described herein is not arranged in the meter but in the ASIC of the security arrangement 6.

FIG. 6 shows a block circuit diagram with the specific interface unit 26 in the machine base with two serial interfaces for connection to the security arrangement 6 (according to the above-explained second version of FIG. 5). The connection to the security arrangement 6 was already basically explained above with reference to FIG. 2*d*. A further data cable 15.2 is added to the first data cable 15.1 or all lines are combined to form a common data cable 15.

The lines are respectively connected to a 50-pole data plug that is plugged into an appertaining plug socket of a transmission circuit 267 of the machine base 24. The transmission circuit 267 has a separate channel for the processing circuit 268 that is basically composed of a series circuit of shift registers SR 6, SR 7, SR 8, SR 9 and further shift registers (not shown) that are looped into the line SEROUT2 for the serial data transmission. Via a jack 269, the line SEROUT2 leads to further shift registers (not shown) in order to charge the actuators and sensors of further stations 27 and 28 of the mail processing machine 20 with data or in order to interrogate sensor data. An end plug 29 connects the serial data lines SEROUT2 and SERIN2, that thus form a closed loop. Medium speed TTL circuits are utilized for the serial data transmission, for which reason the processing circuit 268 can be economically realized. By contrast, the TTL high-speed channel continues to be required for the data transmission to the printing control electronics 81 that is at least one order of magnitude faster.

FIG. 7 shows a block circuit diagram of a third version of the security means 6 with three types of serial interfaces 61, 62 and 63. The serial interface 61 again leads directly to the printing control electronics 81 via opto-couplers and the TTL high-speed channel. The medium speed serial interface 62 is equipped with the sensor/actuator control and opto-couplers—as shown in FIG. 5—and leads separately to the processing circuit 268 of the specific interface unit 26, as shown in FIG. 6. An additional, slow serial interface 63 is equipped with an UART electronics, for example an ST16C450 board or some other, corresponding serial input/output circuit, and with opto-couplers, and serves for the control of the stations of the mail processing machine 20 to the left of the base 24. The three serial interfaces 61, 62 and 63 are connected to the PC system bus 7 via the input/output circuit 64 and are charged in parallel with data of the respective user program for control and interrogation of the mail processing machine 20.

A block diagram with the specific interface unit 26 in the machine base 24, the three serial interfaces 61, 62, 63 for connection to the security arrangement 6 (of the third version according to FIG. 7) is explained with reference to FIG. 8. The arrangement of the circuit ensues as explained in FIG. 6, with the exception of the transmission circuit 267 at the PC-side plug socket of the specific interface unit 26 and with the exception of the jack 269. The transmission circuit 267 contains a further slow channel with a level converter in order to convert the TTL level into a V24 level. The jack 269 is connected to this level converter and now carries the V24 level. Further stations 27 and 28 that are equipped with V24 interfaces in standard fashion can now be connected to the jack 269. The data line SEROUT2 at least containing at least the series circuit of shift registers SR 6 through SR 9 is already connected to the serial data line SERIN2 by a connecting line in the processing circuit 268 in order to form a closed loop.

Shift registers are likewise arranged in the printing control electronics 81, these being coupled to the serial high-speed channel in order to receive at least the printing data of a print column and in order to send status reports.

The printing control electronics 81 contains circuitry (not shown in detail) that can inhibit or enable the printing process. Similar to the method for manipulation-proof print data control (European Application 716 398), for example, an enable can ensue after authorization has been determined and the length of the print data set can be monitored in order to make a manipulation with fraudulent intent more difficult.

As an additional level of security, the authenticity of at least some of the print data is checked by the printing control electronics 81 in one version. A software-based security module of the security arrangement 6 is appropriately fashioned in order to supply the required print data that allow an aforementioned check. A further software module of the security arrangement 6 is appropriately fashioned in order to supply the required print data for a security imprint with signature that can be checked in the Post Office, or by the selected mail carrier.

RSA encryption is applied in another version. The machine base 24 is not necessarily located in a secured housing, as is standard in conventional postage meter machines. Such a measure could not prevent the line 15 from being connected (instead of to the security arrangement 6) to a prepared PC output, via which a sequence of previously detected print signals, for which a debiting no longer exists, would then be generated. One possibility of protecting the data transmission on the line 15 is to encode the transmitted data. To that end, an encryption module is located on the security arrangement 6 at the output side and a corresponding decoding module is located at the receiver side following the interface of the franking printer. The encryption can ensue according to the RSA method previously considered secure. The data line between the decoder module and the register that directly drives the individual print elements of the dot matrix printer, of course, must also be protected. This occurs most simply by casting both modules together, or by integrating their functions in an ASIC, the ASIC being permanently connected to the printhead 82, and only the printhead 82 with the appertaining electronics 81 is protected by a security housing.

An alternative possibility of securing the line 15 is to print encrypted information on the envelope as a marking or signature in addition to the conventional franking information. This information is preferably printed as machine-readable bar code. These printed codes are acquired by specific read devices installed in the Post Office branches or distribution systems and are checked for their authenticity. Even color copies of real franking imprints could be discovered in this way and pulled from the mail flow. The details of such a method are disclosed in German OS 43 44 471 for application in conventional postage meter machines. Compared to the aforementioned solution of the encoded transmission of all information over the line 15, this embodiment described has the advantage that no outlay for decoding the information whatsoever need be incurred at the receiver side in the franking printer, because the encrypted information additionally supplied are also printed encrypted.

The inventive division of processing functions is undertaken in a way that allows a hitherto unachieved degree of security against manipulation to be achieved on the basis of a few measures, even though a standard PC is utilized for the user prompting. Of course, the possibilities of applying the inventive principle are not limited to the described embodiments. For example, it is also in the spirit of the invention to employ a work station instead of a personal computer, or some other intelligent device with a user interface. The application of the invention is likewise not limited to letter mail. On the contrary, the franking printer 82 can also print a label that is glued onto a package. Such a pre-paid packet debiting would exhibit the same security features as the letter processing.

The franking printhead 82 is preferably implemented as a dot matrix printer in order to be able to print changing information, for example, different customer logos. The piezo-ink jet method is an especially suitable printing process. As a result of its high printing speed, it also allows the economic processing of great quantities of letters. Such a printhead is disclosed in detail in U.S. Pat. No. 5,592,203. Transport and printer means for an embodiment of the machine base that allow the printer to print different envelope thicknesses with the same quality is disclosed in German Application 196 05 014.6.

The dialog with the user and the security modules is assumed by a program module that is stored in the personal computer 10 and that is functional under the particular operating system employed. These program modules (user programs) are advantageously utilized in order to operate the system under the operating system Windows® as a franking system, shipping system or postal matter valuation system for a number of carriers.

Figure 11:
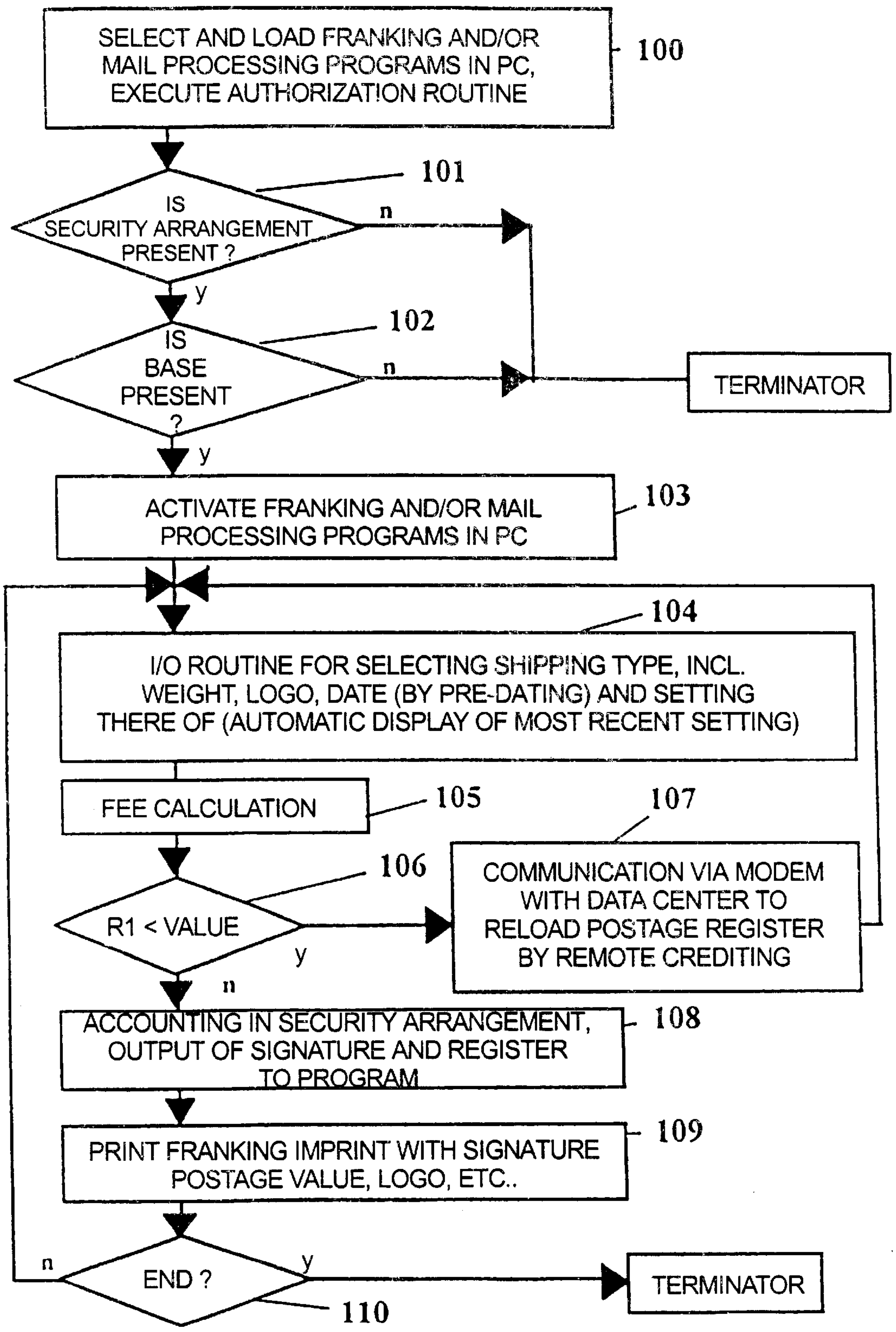
FIG. 11 is a flow chart showing the operation of the inventive mail processing system as a franking system.

FIG. 11 is a flow chart for the operation of the mail processing system as a franking system. The user starts the personal computer 10 and loads this with the appertaining user program in Step 100. The user encounters the customary user interface with a PC keyboard and a PC display unit that based on its hardware equipment, already allows more functions to be implemented in a comfortable way than a meter for a postage meter machine could do. A menu prompting under the operating system Windows® first allows the selection of the desired user program before the loading. After the loading of the desired user program, an automatic check is carried out in Step 101 to determine whether the security arrangement 6 that is allocated to the particular user program or to the respective mail carrier is present. This step also includes the necessary checks in those versions of the invention wherein a number of security modules must be checked, these being respectively allocated to specific mail carriers or wherein a security arrangement is distributed physically among a number of security modules. A further check automatically ensues in step 102 in order to interrogate the connection of the appertaining machine base. The aforementioned checks include a mutual verification of the authorization of at least some of the participating components of the system. If one of the interrogations 101 and 102 indicates an absence of any of those components, the user program is terminated (terminator). Further interrogation steps that are not shown in FIG. 11 can also be executed in addition to the illustrated interrogation Steps 101 and 102. After the aforementioned interrogation, a branch is made to Step 103 in order to activate the user program. A following display and input routine in Step 104 displays non-volatilely stored inputs according to the most recent setting and enables further inputs in menu-supported fashion corresponding to the desired service or the shipping job.

The franking user program contains a Step 105 for postage calculation on the basis of input shipping data and on the basis of a weight that is entered manually or by a scale, or contains a sub-routine for the indirect calculation of the weight on the basis of input data. In a preferred embodiment, the postage calculation contains a sub-routine for determining the most beneficial mail carrier for the corresponding shipping or expediting job. Step 105 can include a sub-step (not shown) wherein currency of the stored fee schedules of the mail carriers is checked before the postage calculation and if the stored tables are non-current a warning can be made or an automatic communication can be initiated to the carrier or some other source in order to obtain and load the current table.

The security arrangement 6 then executed a routine for automatically checking whether the selected services are current and available, and if not a communication with a remote data center 12 is made, whereby specific request data are set by the modem 11 and the required data are received from the data center 12, and whereby the required data are loaded in to the memories of the security means. The modem 11 is either directly or indirectly connected to the security arrangement 6 in order to undertake the communication of the required data upon demand of the security arrangement 6. In the last embodiment, a suitable communication connection via the modem 11 is connected from the data center 12 to the personal computer 10.

The method for determining the most beneficial carrier in the inventive mail processing system then comprises the following steps:

Initialization of the mail processing system with preselection of a group of carriers from which the desired carrier can be subsequently selected, whereby an automatic routine runs in the personal computer during the initialization in order to produce an agreement with current, carrier-related and security-related data that are stored in the at least one security arrangement 6;

Processing inputs with respect to service demands made of the carrier, whereby a mail carrier automatically selected with the processor 1 or a mail carrier entered via the keyboard 9 in combination with the display unit 8 of the personal computer 10 is displayed, and whereby further shipping information such as type of shipping and/or the cost center are manually input at the personal computer by keyboard and/or are automatically input by program;

Automatic selection of those carriers from the aforementioned group of carriers that meet the service demands made, during the processing of inputs with respect to service demands made of the carriers; and Calculation of the postage fee in the security arrangement 6 on the basis of the weight of the postal matter or letter and on the basis of current fee schedules for selected services that are stored in third non-volatile memory areas of the non-volatile memories 68 and 69 of the security arrangement 6, whereby the security processor 77 can access these third non-volatile memory areas in writing and/or reading fashion for updating the fee schedules; as well as Implementation of comparisons of the postage fee for cost optimization in the more limited, automatic selection of the most beneficial carrier by the personal computer 10.

Details of the executive sequences within the framework of such sub-programs are disclosed in greater detail in the aforementioned German Patent Applications 196 17 476.7 and 196 17 557.7, corresponding to U.S. application Ser. Nos. 08/850,413 and 08/850,051 now U.S. Pat. No. 6,035,291. As described therein, the current nature of the stored fee schedules of the mail carriers is thereby also checked and restored as needed without, however, utilizing a security arrangement 6.

After the Step 105 for postage calculation, an interrogation Step 106 ensues for determining a reloading requirement of a franking credit when the remaining value R1 is smaller than the calculated postage value. Given the presence of such a reloading requirement, a branch is made to a Step 107 for setting up a communication by modem with a data center, for example, the telepostage data center of FP, for reloading the postage registers with a franking credit on the basis of a remote crediting. As described above, the personal computer 10—shown in FIG. 1—contains a modem 11 connected to the security arrangement 6 via the PC system bus 7 that sets up the communication connection to the remote telepostage data center. Alternatively, however, the modem 11 (in a way that is not shown) can be connected to the security arrangement 6 via a serial interface.

After completion of Step 107 for setting up a communication by modem and after the reloading, a branch is made back to the display and input routine in Step 104.

Otherwise, a branch is made from Step 106 to Step 108 for the accounting in the security module, including output to the print routine of the register values and of the signature, which initiates a printing of the postal matter in Step 109 using stored data corresponding to the settings undertaken in Step 104. The fixed data, particularly frame data of the stamp image corresponding to the selected mail carrier, and the semi-variable window data, particulary advertising slogan graphics data, as well as the variable window data relating to postage value in the postage stamp, date in the date stamp and the signature, together form a security imprint. The signature is formed in the security arrangement 6 from at least a part of an encoded checksum and is attached to the stamp image. It is unique for each piece of mail and thus allows a verification of the paid mail that was franked. Finally, the interrogation Step 110 is reached in order to determine the termination of the mail processing (terminator) or to otherwise branch back to the Step 104 for display and input for a further franking with modified settings. The printing of the postal matter in Step 109 includes a number of sub-routines that sequence exclusively in the security arrangement 6 and assure that a franking ensues with the debited postage value or contribute to the monitoring and control of the machine base 24.

Figure 8:
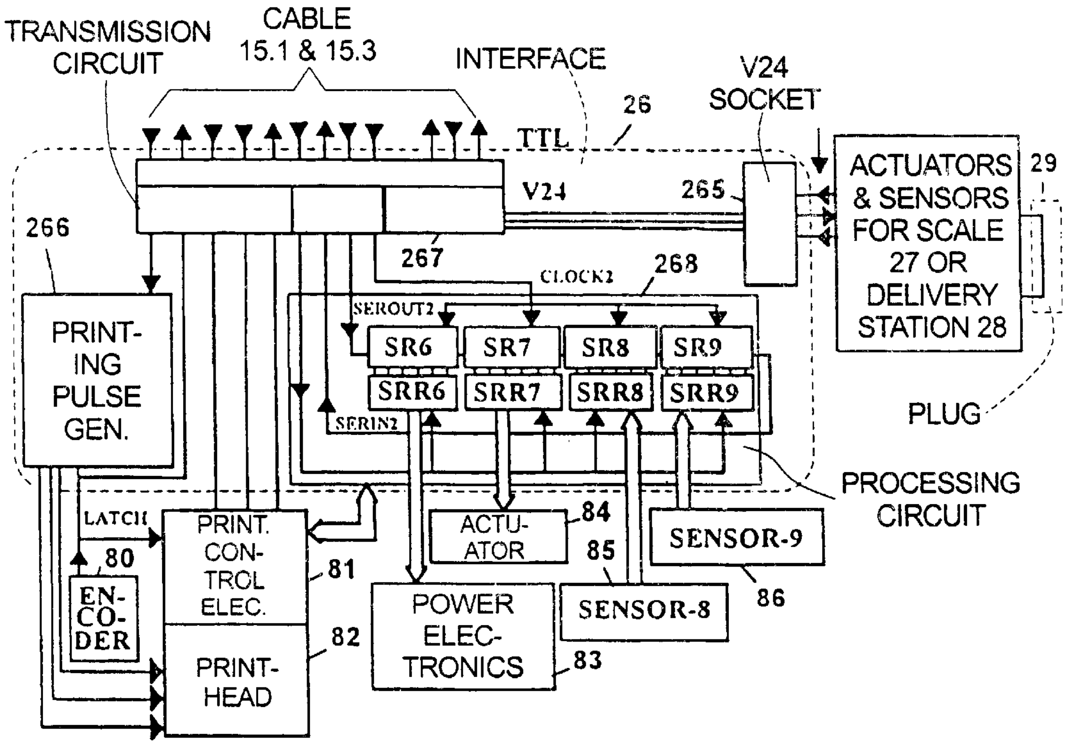
FIG. 8 is a block circuit diagram showing the specific interface unit in the machine base for three serial interfaces for connection to the third version of the security arrangement according to FIG. 7.

Preferably, an embodiment of the security arrangement 6—shown in FIGS. 7 and 8—and of the specific interface unit 26 is employed in the machine base 24. The print data transfer to the machine base 24 ensues via a first, fast serial interface in the security arrangement 6 via the data cable 15.1, and the control of the machine base 24 ensues via a second serial interface in the security arrangement 6 via the data cable 15.3. A third serial interface is also preferably provided in the security arrangement 6 in order to drive further peripheral devices like automatic delivery station 28 and dynamic scale 27 connected to the machine base 24. Further data lines separate from the serial interface lines are also provided for the time-dependent controls. Advantageously, all lines are combined in a single data cable 15. The lines are respectively connected to a fifty-pole data plug that is plugged into an appertaining plug socket of a transmission circuit 267 of the machine base 24.

The production of further versions is possible analogous to the second version of a mail processing system shown in FIG. 2B in that further components can be arranged preceding or following the dynamic scale 27 between the automatic delivery station 28 and the machine base 24. The data are supplied to the machine base 24 from the individual components via a data cable 25 (for example 25.1 through 25.3) before data are transmitted between the specific, fast interface unit 26 and the personal computer 10 via the high-speed channel.

Analogous to the third embodiment shown in FIG. 2*c*, the automatic delivery station, the dynamic scale 27 and the machine base 24 as well as the additional components can likewise be respectively equipped with a separate, fast interface to the personal computer 10. The fast, serial interface 61 that includes a data transmission and monitoring unit is equipped with a corresponding number of terminals for the high-speed channels of the security arrangement 6.

By employing a number of security arrangement 6 and a corresponding number of program data modifications that are introduced into the system via the hard drive 5 or externally, for example from a CD disk drive via the in/out port 4, the system can be advantageously adapted to the mail expediting conditions that differ from mail carrier to mail carrier.

When, for example, a new, further, private mail carrier appearing in the market of mail carriers is to be added to the system and taken into consideration in the accounting, a security arrangement 6 therefore can be added or can replace an existing security arrangement. The postage calculation for a specific mail carrier is implemented in the security arrangement 6 by the security processor 77 according to a program that is stored in the program memory EPROM 71 and is customized for the mail carrier. The accounting again ensues by hardware with the accounting unit 66 and the FRAM memories 68 and 69.

In another version, a number of such postage calculation programs are stored in the program memory EPROM 71. The postage calculation for a specific mail carrier from the number of mail carriers is implemented in the security arrangement 6 by the security processor 77 according to a corresponding program that is stored in the program memory EPROM 71 and is specifically customized for a selected mail carrier. A number of hardware accounting units 60 and FRAM memories 68 and 69 are also provided. For the hardware-implemented accounting, a specific hardware accounting circuit that is selected dependent on the selection of the mail carrier exists in the set of hardware accounting units 60 and appertaining FRAM memories 68 and 69. Such sets of hardware accounting units 60 with appertaining, non-volatile memory modules 68 and 69 is provided in the security arrangement 6 in accord with the number of mail carriers in order to undertake an accounting of postage values. In the limit case, at each security arrangement 6 contains an accounting circuit related to a single mail carrier, so that an identical number of security arrangement 6 is utilized in the personal computer 10 for a like number of different mail carriers. At the output side, each security arrangement 6 is connected via an adapter to the first data cable 15, whereby the adapter loops the print data of the respective security arrangement 6 which is currently being employed into the high-speed channel. The user program set in the personal computer 10 assures that only one of the security arrangement 6 can serially communicate print data at a time.

Although modifications and changes may be suggested by those skilled in the art, it is the intention of the inventor to embody within the patent warranted hereon all changes and modifications as reasonably and properly come within the scope of his contribution to the art.

I claim as my invention:

1. A mail processing system comprising:

a personal computer (PC) having a plurality of PC components connected to each other via a PC bus;

a machine base including printing means for electronically printing on postal items of respectively different thicknesses, said printing means including an electronic printhead and printing control electronics, said machine base further including a base interface unit containing a single processor consisting of a base interface processing circuit;

a cable extending from said personal computer and connected to said printing control electronics and to said base interface unit;

service request means, connected to said PC bus, for entering data for processing postal items in said PC for at least one carrier;

a security module dedicated to a carrier, said security module being removably insertable in said PC; and said security module comprising means for conducting security and accounting functions, only for the carrier to which said module is dedicated, in said processing in said PC of postal items for said carrier to which said module is dedicated.

2. A mail processing system as claimed in claim 1 wherein said machine base further includes conveyor means for conveying postal items past said printhead.

3. A mail processing system as claimed in claim 2 wherein said conveyor means includes an encoder which emits an output signal identifying a speed of conveyance of a postal item past said printhead, and wherein said base interface unit includes a high-speed channel and a print pulse generator, said high-speed channel being connected to an input of said printing control electronics and said print pulse generator being connected between said encoder and said printhead for, in response to said output signal from said encoder, enabling printing by said printhead.

4. A mail processing system as claimed in claim 1 comprising a plurality of individually controllable stations and a plurality of respective data cables interconnecting said individually controllable stations with said machine base so that said machine base and said individually controllable stations form a mail processing machine.

5. A mail processing system as claimed in claim 4 wherein said individually controllable stations include an automatic delivery station for postal items connected to said base station via a data cable, and wherein said PC includes means for controlling both said base station and said automatic delivery station via said cable extending from said PC for automatically supplying a postal item to said machine base.

6. A mail processing system as claimed in claim 4 wherein said individually controllable stations include a dynamic scale connected to said base station via a data cable.

7. A mail processing system as claimed in claim 4 wherein said individually controllable stations include a dynamic scale connected to said base station via a first data cable and to said PC via a separate, second data cable.

8. A mail processing system as claimed in claim 7 wherein said individually controllable stations further include an automatic delivery station connected to said dynamic scale via a third data cable.

9. A mail processing system as claimed in claim 1 further comprising a plurality of individually controllable stations each having a data line associated therewith, said data lines being combined in a single data cable connected to said base interface unit of said machine base, said machine base and said individually controllable stations forming a mail processing machine.

10. A mail processing system as claimed in claim 1 wherein said means for conducting security and accounting functions in said ASIC include a hardware accounting unit for implementing an accounting function, and wherein said data interface connecting said ASIC to said cable comprises a serial interface having a monitoring circuit and couplers for voltaic separation, said monitoring circuit being in communication with at least one of said printing control electronics and said base interface processing circuit.

11. A mail processing system as claimed in claim 1 further comprising a modem connected to said security processor means via said parallel input/output interface and connected to said PC bus, said security processor means comprising means for conducting a tamper-proof credit reloading into postal registers stored in said non-volatile memory via said modem.

12. A mail processing system as claimed in claim 1 wherein said security module contains a parallel input/output interference connected to said PC bus when said module is inserted in said PC, an application-specific integrated circuit (ASIC) connected to said input/output interface and communicating with said PC bus when said module is inserted in said PC , said ASIC containing a data interface connecting said ASIC to said cable when said module is inserted in said PC, said data interface comprising means for data transmission between said A SIC and at least one of said printing control electronics and said base interface processing circuit, and said security module further containing security processor means, containing a security routine not readable by said PC, for implementing a security function using said routine, and a non-volatile memory, and wherein said means for conducting security and accounting function only for the carrier to which said module is dedicated are connected to said security processor and to said non-volatile memory.

13. A mail processing system as claimed in claim 1 wherein said security module contains security processor means, containing a security routine not readable by said PC, for implementing a security function using said routine, and a non-volatile memory, and wherein said means for conducting security and accounting functions only for the carrier to which said module is dedicated is connected to said security processor means and to said non-volatile memory.

14. A mail processing system as claimed in claim 13 wherein said hardware accounting unit further comprises a serial interface including a sensor/actuator control with couplers for voltaic separation for controlling at least said base station via said base interface processing circuit.

15. A mail processing system as claimed in claim 14 further comprising a plurality of individual controllable stations connected by respective data lines to said base interface unit, said base interface unit including a transmission circuit connected to said data lines, and wherein said serial interface operates at a first speed and said hardware accounting unit further comprises an interface, operating at a second speed that is slower than said first speed, having an UART circuit and couplers for voltaic separation for controlling said individually controllable stations via said transmission circuit of said base interface unit.

16. A mail processing system as claimed in claim 15 wherein said transmission circuit comprises a plug socket for a data plug from said data lines, and level converter means for converting transistor-transistor logic signals in said machine base into signals for a serial binary data interchange.

17. A mail processing system comprising:

a personal computer (PC) having a plurality of PC components connected to each other via a PC bus, said PC components including a PC processor and a program memory accessible by said PC processor;

a machine base including printing means for electronically printing on postal items of respectively different thicknesses, said printing means including an electronic printhead and printing control electronics, said machine base further including a base interface unit containing a single processor consisting of a base interface processing circuit;

a cable extending from said personal computer and connected to said printing control electronics and to said base interface unit;

service request means, connected to said PC bus for entering data for processing postal items in said PC for at least one carrier;

a security module dedicated to a carrier comprising a portion of at least one of said PC processor and said program memory, said security module having a parallel input/output interface connected to said PC bus, said module further including an ASIC connected to said input/output interface, said ASIC containing a data interface connecting at least one of said printing control electronics and said base interface processing circuit to said cable, said data interface comprising means for data transmission between said ASIC and at least one of said printing control electronics and said base interface processing circuit, and said module further containing security processor means, containing a security routine not readable by said PC, for implementing a security function using said routine, and a non-volatile memory; and said ASIC comprising means connected to said security processor and to said non-volatile memory for conducting security and accounting functions, only for the carrier to which said module is dedicated, in said processing in said PC of postal items for said carrier to which said module is dedicated.

18. A mail processing system as claimed in claim 17 wherein said hardware circuit comprises a plurality of hardware accounting units each having a non-volatile memory module associated therewith, said plurality of hardware accounting units being equal in number to a plurality of mail carriers and each hardware accounting unit being dedicated for accounting of postage values for one of said carrier.

19. A mail processing system as claimed in claim 17 further comprising a plurality of further security modules, respectively formed as parts of at least one of said PC processor and said program memory, each security module being connected to said cable extending from said PC via a respective adapter, each adapter looping printing data to said printing control electronics in said machine base via the data interface in the respective security module.

* * * * *